Hickok & Reisinger,
Cutter Holder,

Nº 83,963.        Patented Nov. 10, 1868.

Witnesses.
Gustave Dieterich
Wm A Morgan

Inventors,
W. O. Hickok
G. W. Reisinger
per Munn & Co.
Attorneys

W. O. HICKOK AND GEORGE W. REISINGER, OF HARRISBURG, PENNSYLVANIA.

Letters Patent No. 83,963, dated November 10, 1868.

IMPROVED TOOL-HOLDER FOR LATHES.

The Schedule referred to in these Letters Patent and making part of the same.

To all whom it may concern:

Be it known that we, W. O. HICKOK and GEORGE W. REISINGER, of Harrisburg, in the county of Dauphin, and State of Pennsylvania, have invented a new and improved Tool-Holder for Lathes; and we do hereby declare that the following is a full, clear, and exact description thereof, which will enable those skilled in the art to make and use the same, reference being had to the accompanying drawings, forming part of this specification.

This invention relates to a new and improved tool-holder for the slide-rest of turning-lathes; and it consists in the combination, with a holder of novel construction, and a screw-cutting tool, narrowing from the top downward, of a tapered wedge, for adjusting the tool to cut threads of a right and left pitch.

In the accompanying sheet of drawings—

Figures 3, 4, 5, and 6, detached views of tools, which are fitted in the holder.

Similar letters of reference indicate like parts.

A represents a tool-holder, having a longitudinal socket, which is of rectangular form in its transverse section, and of any suitable length. A trifle shorter than a tool before being worn by use would be the most desirable length.

Figure 1:
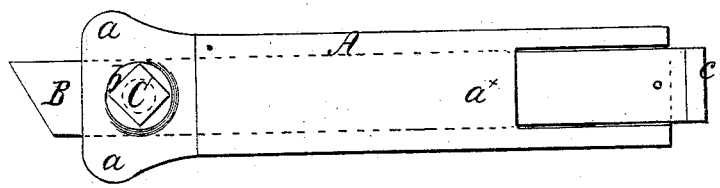
Figure 1 is a side view of our invention.
Figure 2:
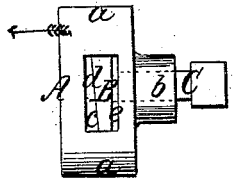
Figure 2 is a front or outer end view of the same.

This socketed holder may be made of iron, brass, or other suitable metal, and its internal diameter should be such that it will receive a tool, B, without admitting of any vertical play of the latter; that is to say, the depth of the internal diameter should be equal to the depth of the tool, as will be fully understood by referring to figs. 1 and 2.

The width of the internal diameter of the socket considerably exceeds the thickness of the tool, as shown in fig. 2.

The outer end of the holder is preferably made to expand considerably in a vertical direction, or is formed with a swell or protuberance, $a\ a$, at its upper and under sides, to insure strength at the part where strength is most required, and a lateral hub or projection, $b$, is at one side of the outer part of the socket, which hub or projection is tapped, or provided with an internal screw-thread, to receive a set-screw, C, which secures the tool in the holder.

One side, $a^\times$, of the holder or socket A is somewhat shorter than the other, to facilitate the insertion of the tools therein, and their withdrawal therefrom.

In securing the tool in the socket, the set-screw C may be screwed up directly against the tool, and the latter pressed against one side of the socket, but I prefer inserting a wedge or key, $c$, of a form to suit the form of the tool, between the tool and the side of the socket, as shown in fig. 2.

A screw-cutting tool, B, may, with the greatest facility, be adjusted in this holder, so as to cut in either direction of the movement of the holder, that is to say, from right to left, and vice versa, by simply tapering the tool from top to bottom, and introducing a wedge, C, tapering from bottom to top, and changing the wedge from one side to the other of the tool, whereby it will be pitched in either direction, it being understood, of course, that the side of the tool which faces the direction of the cut should have an inclined position, as denoted at $d$, fig. 2, the opposite side, $e$, being vertical.

The arrow in fig. 2 shows the direction of the movement of the holder or socket when at work, and the tool is adjusted as shown in said figure.

Figures 3, 4, 5, 6:
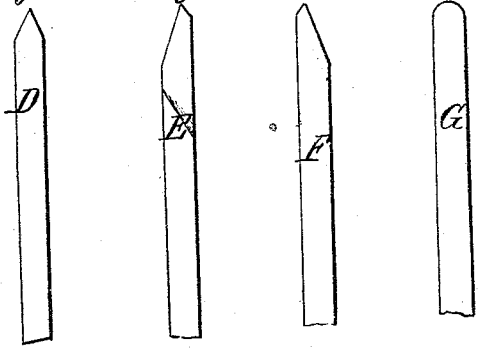

Fig. 3 shows a tool, D, having a v-shaped cutting-edge, for cutting corresponding-shaped screw-threads.

E and F, figs. 4 and 5, show ordinary turning-tools for turning off or reducing the diameter of cylindrical articles.

Fig. 6, a tool, G, for cutting directly into the work or article in the lathe, while the tool B in the holder or socket is designed for cutting square screw-threads, or those having parallel sides, and an exterior or outer surface at right angles with the sides.

It will readily be perceived that our improved holder admits of the tools being readily taken out for grinding, or for other purposes, without disturbing the holder in the tool-post; also that it supports the tools very nearly to the point of cutting, thereby preventing chattering, and that it will hold them until they are worn quite short.

We claim as new, and desire to secure by Letters Patent—

The employment, in combination with the improved tool-holder, herein described, and a screw-cutting tool, narrowing from the top downward, of a tapered wedge, $c$, for adjusting the tool to cut threads of a right or left pitch, substantially as and for the purpose described.

W. O. HICKOK.
G. W. REISINGER.

Witnesses:
E. H. HICKOK,
S. SCHRIVER.